United States Patent
Huang (10) Patent No.: US 10,338,304 B2
(45) Date of Patent: Jul. 2, 2019

(54) BACKLIGHT MODULE AND DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 15/701,433

(22) Filed: Sep. 11, 2017

(65) Prior Publication Data
US 2018/0348424 A1    Dec. 6, 2018

(30) Foreign Application Priority Data

Jun. 1, 2017   (CN) .......................... 2017 1 0404424

(51) Int. Cl.
*G02B 6/00*   (2006.01)
*F21V 8/00*   (2006.01)
*G02F 1/1335* (2006.01)

(52) U.S. Cl.
CPC ......... *G02B 6/0078* (2013.01); *G02B 6/0016* (2013.01); *G02B 6/0031* (2013.01);
(Continued)

(58) Field of Classification Search
CPC .. G02B 6/0078; G02B 6/0068; G02B 6/0066; G02B 6/0086; G02B 6/0088;
(Continued)

(56) References Cited

U.S. PATENT DOCUMENTS 8,054,404 B2    11/2011   Uchida et al.
9,049,437 B2     6/2015   Huang
(Continued)

FOREIGN PATENT DOCUMENTS

JP       9-54271 A      2/1997
TW    200604466 A      2/2006
(Continued)

OTHER PUBLICATIONS

Jorke, Helmut, and Markus Fritz. "INFITEC—A New Stereoscopic Visualisation Tool by Wavelength Multiplex Imaging." Sep. 11, 2006, 10:21, www.it.uu.se/edu/course/homepage/igs/ht07/lectures/F4_070913_infitec_english.pdf. (Year: 2006).*
(Continued)

*Primary Examiner* — Gerald J Sufleta, II
(74) *Attorney, Agent, or Firm* — CKC & Partners Co., LLC (57) ABSTRACT

A backlight module includes two light guide plates, two light-emitting modules, and a controller. Each of the light guide plates has an incident surface and a light-output surface. The light guide plates are arranged side-by-side to make the light-output surfaces be coplanar. Each of the light-emitting modules is configured to provide a first kind of light and a second kind of light to the incident surface of the corresponding light guide plate. The first kind of light has a first triplet. The second kind of light has a second triplet different from the first triplet. The controller is configured to asynchronously drive any of the light-emitting modules to alternately provide the first kind of light and the second kind of light.

7 Claims, 5 Drawing Sheets

(52) U.S. Cl.
CPC ......... *G02B 6/0068* (2013.01); *G02B 6/0088* (2013.01); *G02F 1/133602* (2013.01)

(58) Field of Classification Search
CPC .. G02B 6/0091; G02B 27/22; G02B 27/2264; G02B 27/2228–27/2242; G02B 27/225; G02F 1/133602; G02F 1/133603; G02F 1/1323; G02F 2001/133607; G02F 1/133613
USPC .......................................................... 349/15
See application file for complete search history.

(56) References Cited

U.S. PATENT DOCUMENTS

| | | | |
|---|---|---|---|
| 2013/0127935 A1 | 5/2013 | Wan et al. | |
| 2014/0218648 A1* | 8/2014 | Palmer | G02B 27/2264 349/15 |
| 2015/0339996 A1 | 11/2015 | Schuck et al. | |
| 2016/0033705 A1* | 2/2016 | Fattal | G02B 6/0068 349/15 |
| 2016/0054574 A1* | 2/2016 | Huang | H04N 13/363 349/33 |
| 2016/0139419 A1* | 5/2016 | Huang | H04N 13/363 359/465 |
| 2017/0171533 A1* | 6/2017 | Benitez | H04N 13/383 |
| 2018/0003999 A1* | 1/2018 | Minano | G02B 27/2264 |

FOREIGN PATENT DOCUMENTS

| | | |
|---|---|---|
| TW | 200735002 A | 9/2007 |
| TW | I461740 B | 11/2014 |
| TW | I535264 B | 5/2016 |
| TW | 201619672 A | 6/2016 |

OTHER PUBLICATIONS

A. Simon, et al., "Interference-filter-based stereoscopic 3D LCD", Journal of Information Display, vol. 11, No. 1, ISSN 1598-0316, Mar. 2010.

* cited by examiner

BACKLIGHT MODULE AND DISPLAY DEVICE

RELATED APPLICATIONS

This application claims priority to China Application Serial Number 201710404424.8, filed Jun. 1, 2017, which is herein incorporated by reference.

BACKGROUND

Technical Field

The present disclosure relates to a backlight module and a display device.

Description of Related Art

In the human body, the positions of the left eye and the right eye are different, and the observed images of the left eye and the right eye may have slight differences, which is the fundamental cause of stereopsis. According to the approaches of providing the different images, stereoscopic display devices can be classified into the polarized type, the anaglyphic type, wavelength multiplexed type.

As the name implies, a wavelength multiplexed type stereoscopic display device achieves stereopsis by providing images of different wavelength ranges to observers. In a color image, various colors within the color gamut are mostly mixed from three primary colors (i.e., red, green, and blue), so the conventional wavelength multiplexed type stereoscopic display device provides an image mixed from a set of three primary colors (R1, G1, B1) to the left eye and another image mixed from another set of three primary colors (R2, G2, B2) to the right eye.

Recently, a kind of wavelength multiplexed type stereoscopic display device using direct back-lit backlight technology has been developed, which provides two sets of three primary colors by two sets of light sources uniformly distributed. However, owing to adopting the direct back-lit backlight technology, the conventional wavelength multiplexed type stereoscopic display device usually has a large housing thickness, and the number of the used light sources is too large. Accordingly, how to reduce the overall size of the stereoscopic display device and the number of used light sources have become one of the most important research topics.

SUMMARY

An aspect of the disclosure is to provide a backlight module which can reduce the overall size and the number of used light sources and provide a display device using the backlight module.

According to an embodiment of the disclosure, a backlight module includes two light guide plates, two light-emitting modules, and a controller. Each of the light guide plates has an incident surface and a light-output surface. The light guide plates are arranged side-by-side to make the light-output surfaces be coplanar. Each of the light-emitting modules is configured to provide a first kind of light and a second kind of light to the incident surface of a corresponding one of the light guide plates. The first kind of light has a first triplet, and the second kind of light has a second triplet different from the first triplet. The controller is configured to asynchronously drive any of the light-emitting modules to alternately provide the first kind of light and the second kind of light.

In an embodiment of the disclosure, each of the light-emitting modules includes a first light emitter, a second light emitter, a first filter, a second filter, and a light guide assembly. The first filter has a first light reflection spectrum. The second filter has a second reflection spectrum. The light guide assembly is configured to respectively guide lights emitted by the first light emitter and the second light emitter to the first filter and the second filter, so as to respectively obtain the first kind of light and the second kind of light. The light guide assembly is further configured to guide the first kind of light and the second kind of light to the incident surface of the corresponding one of the light guide plates.

In an embodiment of the disclosure, the light guide assembly includes a first total reflection prism and a second total reflection prism. The first total reflection prism has a first surface, a second surface, and a third surface sequentially connected. The second total reflection prism has a fourth surface, a fifth surface, and a sixth surface sequentially connected. The first surface and the fourth surface face away from each other. The second surface and the fifth surface face away from each other. The third surface and the sixth surface face away from each other. The first light emitter and the second light emitter emit the lights toward the first surface. The first filter and the second filter are respectively disposed at the fourth surface and the second surface.

In an embodiment of the disclosure, the light guide assembly further includes a collimating lens. The collimating lens is configured to respectively transform the lights emitted by the first light emitter and the second light emitter into a first collimating light and a second collimating light, and is configured to make incident angles of the first collimating light and the second collimating light relative to the third surface be different.

In an embodiment of the disclosure, the light guide assembly further includes a light guide element. The light guide element is optically coupled between the fifth surface and the incident surface of the corresponding one of the light guide plates. The light guide element is substantially aligned with the incident surface of the corresponding one of the light guide plates, and is aligned with the fifth surface in a direction substantially parallel to the incident surface of the corresponding one of the light guide plates.

In an embodiment of the disclosure, the first light emitter and the second light emitter are substantially arranged side-by-side in a first direction. Each of the first light emitter and the second light emitter has a plurality of light sources. The light sources of any of the first light emitter and the second light emitter are substantially arranged along a second direction.

In an embodiment of the disclosure, the controller is configured to drive the light-emitting modules to provide the first kind of light and the second kind of light respectively in four time intervals in a working cycle.

In an embodiment of the disclosure, the working cycle sequentially has a first time interval, a second time interval, a third time interval, a fourth time interval, a fifth time interval, and a sixth time interval. The controller is configured to drive one of the light-emitting modules to provide the first kind of light and the second kind of light respectively in the first time interval and the fourth time interval, and configured to drive another of the light-emitting modules to provide the first kind of light and the second kind of light respectively in the third time interval and the sixth time interval.

According to another embodiment of the disclosure, a display device includes the foregoing backlight module and a liquid crystal display panel. The liquid crystal display panel has a light-receiving surface. The light-output surfaces of the light guide plates respectively face two parts of the light-receiving surface.

In an embodiment of the disclosure, the liquid crystal display panel has a scanning direction of vertical synchronization. The light guide plates are substantially arranged along the scanning direction of vertical synchronization.

Accordingly, the backlight module of the disclosure uses two light-emitting modules to emit lights respectively to side surfaces of two light guide plates, and the controller of the backlight module is capable of driving two light emitters in each of the light-emitting modules to provide two kinds of lights respectively in different time intervals. Furthermore, the backlight module of the disclosure can use the controller to sequentially switch on and off four light emitters by appropriately acting in concert with the scanning direction of vertical synchronization of the liquid crystal display panel, so that the display device of the disclosure can specifically implement the display technology adopting time-division multiplexing and wavelength multiplexing under the back-lit architecture. In addition, because the backlight module of the disclosure belongs to the back-lit architecture, the display device of the disclosure can effectively reduce the overall size and the number of used light sources compared with the conventional stereoscopic display device adopting the direct back-lit backlight technology.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
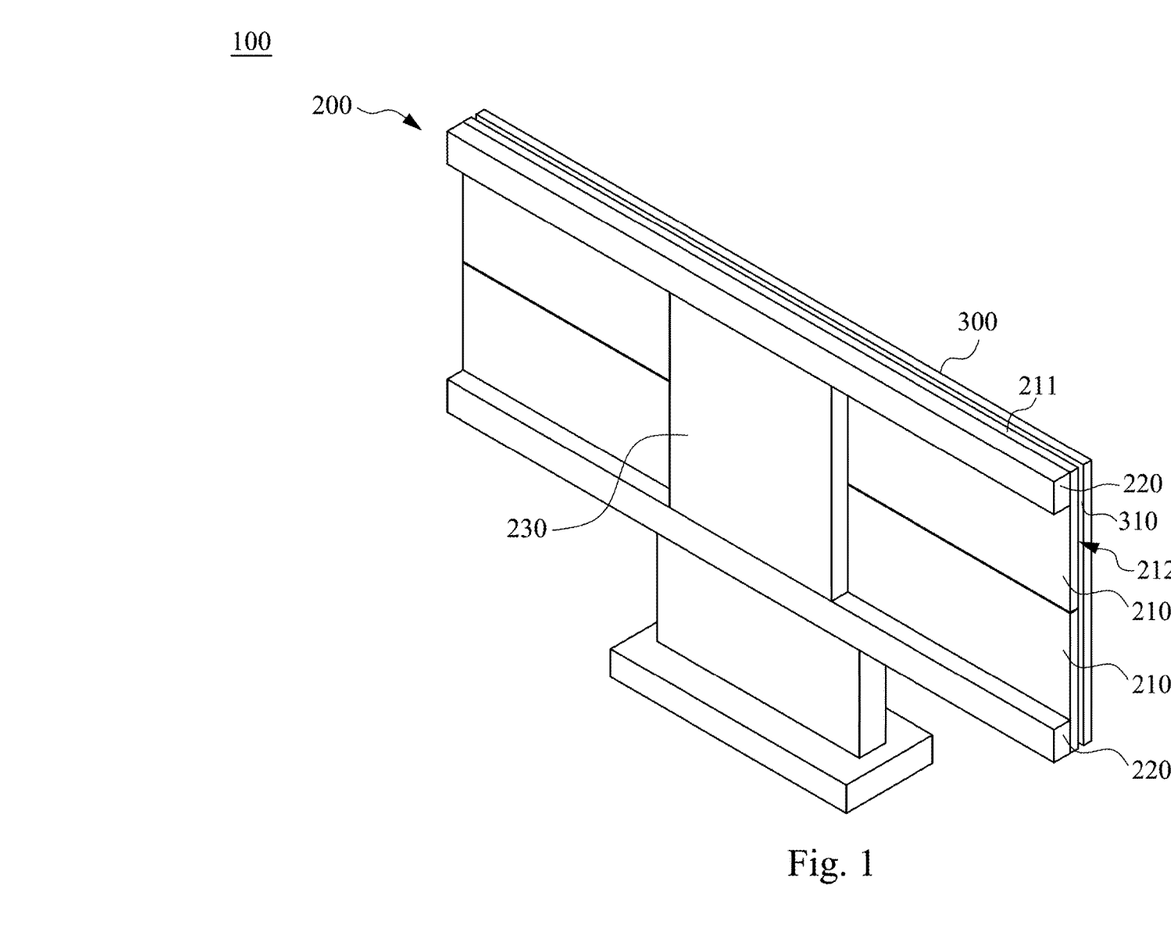
FIG. 1 is a perspective view of a display device according to an embodiment of the disclosure.

Reference is made to FIG. 1. FIG. 1 is a perspective view of a display device 100 according to an embodiment of the disclosure. As shown in FIG. 1, the display device 100 includes a backlight module 200 and a liquid crystal display panel 300. The backlight module 200 includes two light guide plates 210, two light-emitting modules 220, and a controller 230. The structures and functions of the above-mentioned components of the backlight module 200 and the connection relationships among the components will be described in detail below.

Figure 2:
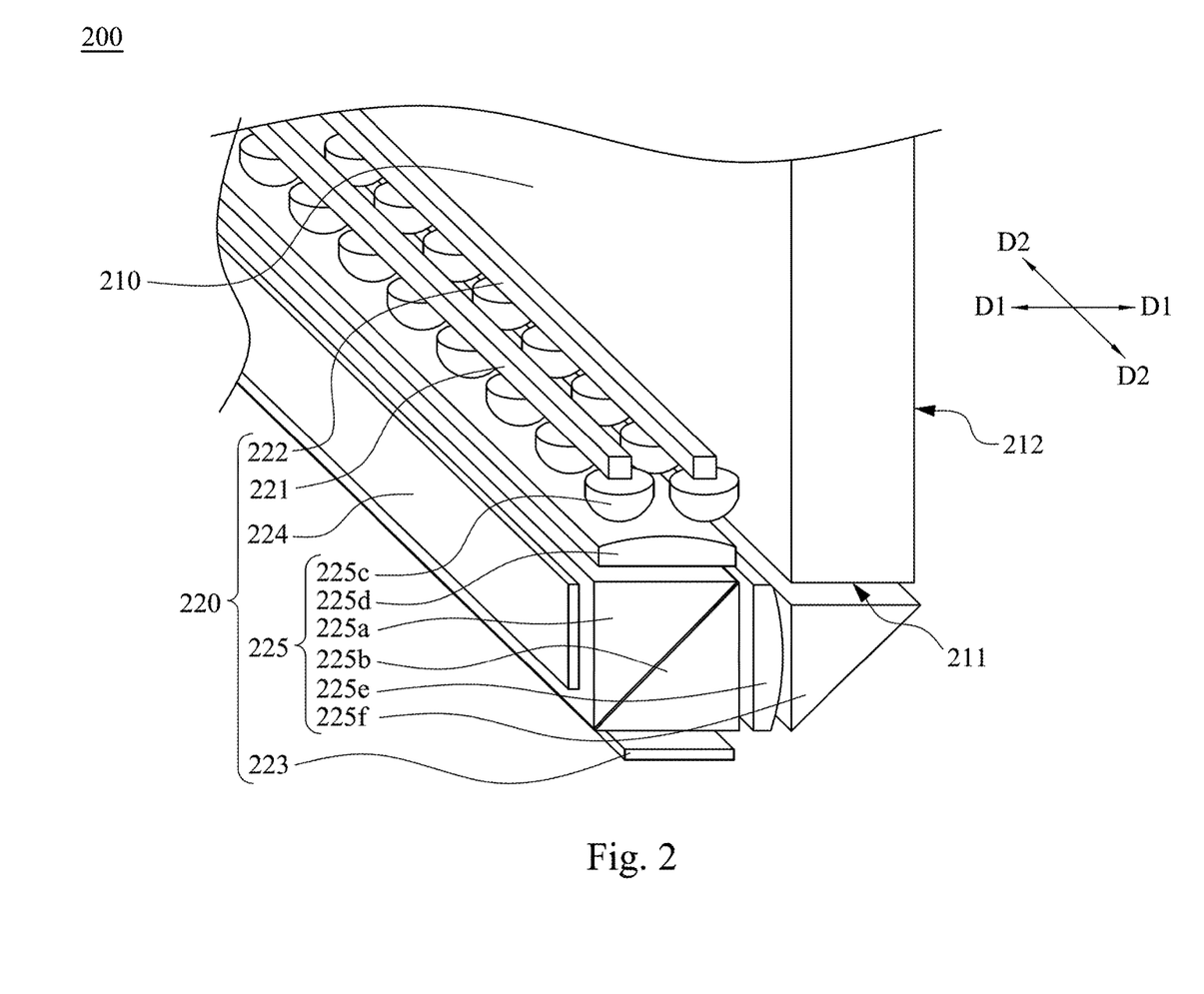
FIG. 2 is a partial perspective view of a backlight module according to an embodiment of the disclosure.
Figure 3:
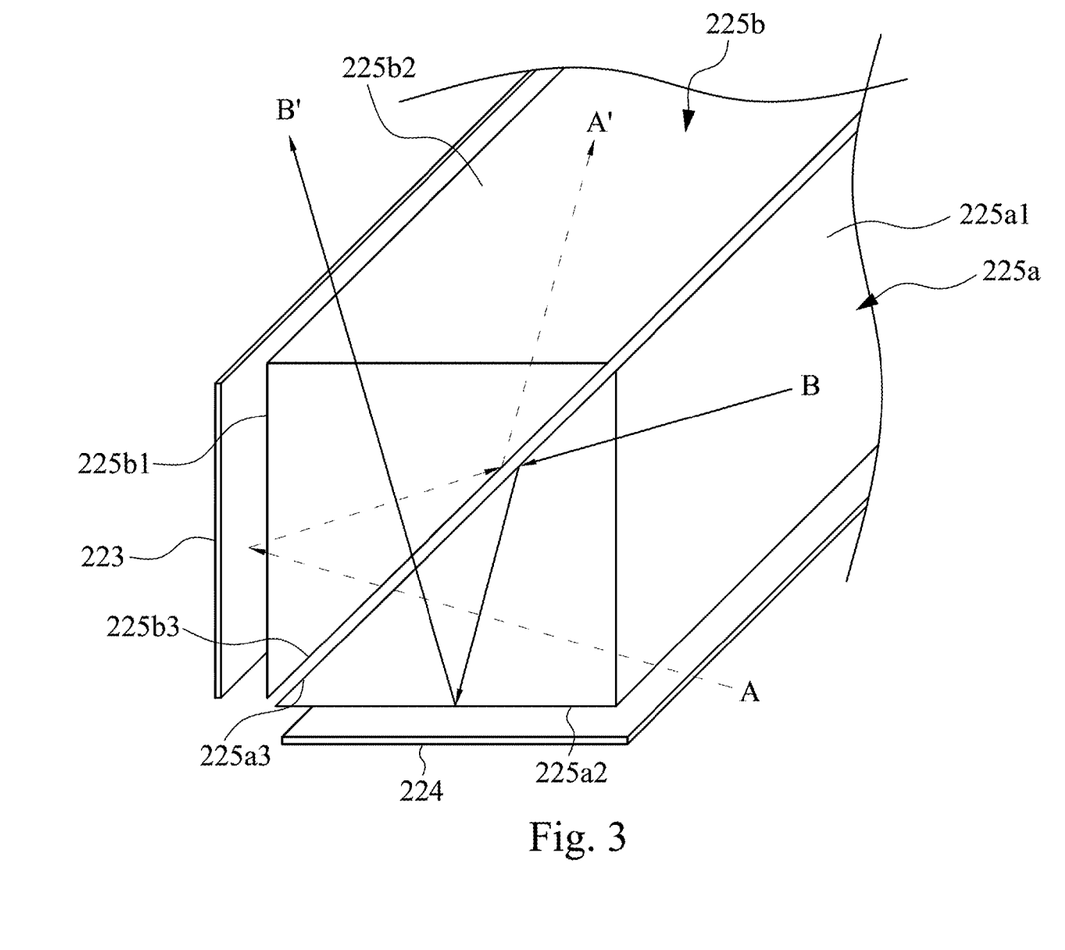
FIG. 3 is a partial perspective view of some components in FIG. 2.

Reference is made to FIGS. 2 and 3. FIG. 2 is a partial perspective view of the backlight module 200 according to an embodiment of the disclosure. FIG. 3 is a partial perspective view of some components in FIG. 2. As shown in FIGS. 1-3, each of the light guide plates 210 has an incident surface 211 and a light-output surface 212. The light guide plates 210 are arranged side-by-side to make the light-output surfaces 212 be coplanar. The liquid crystal display panel 300 has a light-receiving surface 310. The light-output surfaces 212 of the light guide plates 210 respectively face two parts of the light-receiving surface 310.

Each of the light-emitting modules 220 is configured to provide a first kind of light A' and a second kind of light B' (labelled in FIG. 3) to the incident surface 211 of a corresponding one of the light guide plates 210. The first kind of light A' has a first triplet. The second kind of light B' has a second triplet different from the first triplet. For example, the first triplet of the first kind of light A' corresponds to a set of three primary colors R1, G1, B1, and the second triplet of the second kind of light B' corresponds to another set of three primary colors R2, G2, B2.

Figure 4:
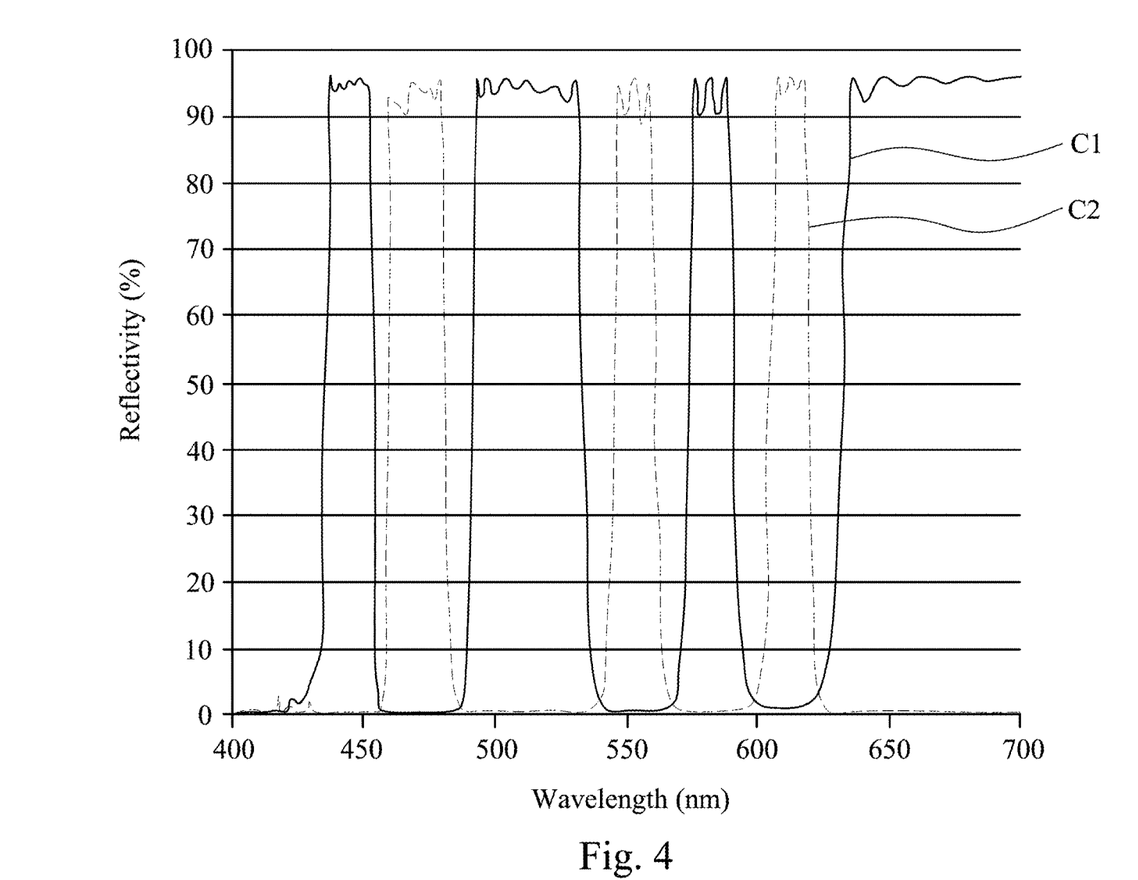
FIG. 4 is a reflectivity-wavelength graph of a first filter and a second filter according to an embodiment of the disclosure.

Specifically, each of the light-emitting modules 220 includes a first light emitter 221, a second light emitter 222, a first filter 223, a second filter 224, and a light guide assembly 225. Reference is made to FIG. 4. FIG. 4 is a reflectivity-wavelength graph of the first filter 223 and the second filter 224 according to an embodiment of the disclosure. It can be seen from the reflectivity-wavelength curves C1, C2 in FIG. 4 that the first filter 223 has a first light reflection spectrum, the second filter 224 has a second reflection spectrum, and the first light reflection spectrum is deviated from the second reflection spectrum. The light guide assembly 225 is configured to respectively guide lights emitted by the first light emitter 221 and the second light emitter 222 to the first filter 223 and the second filter 224, so as to respectively obtain the first kind of light A' and the second kind of light B'. The first triplet of the first kind of light A' substantially matches with the first light reflection spectrum, and the second triplet of the second kind of light B' substantially matches with the second light reflection spectrum. The light guide assembly 225 is further configured to guide the first kind of light A' and the second kind of light B' to the incident surface 211 of the corresponding one of the light guide plates 210.

Furthermore, in order to achieve the purposes of respectively guiding the lights emitted by the first light emitter 221 and the second light emitter 222 to the first filter 223 and the second filter 224 and guiding the first kind of light A' and the second kind of light B' to the incident surface 211 of the corresponding one of the light guide plates 210, the light guide assembly 225 includes a first total reflection prism 225a and a second total reflection prism 225b in the present embodiment. As shown in FIG. 3, the first total reflection prism 225a has a first surface 225a1, a second surface 225a2, and a third surface 225a3 sequentially connected. The second total reflection prism 225b has a fourth surface 225b1, a fifth surface 225b2, and a sixth surface 225b3 sequentially connected. The first surface 225a1 and the fourth surface 225b1 face away from each other. The second surface 225a2 and the fifth surface 225b2 face away from each other. The third surface 225a3 and the sixth surface 225b3 face away from each other. The first light emitter 221 and the second light emitter 222 emit the lights toward the first surface 225a1. The first filter 223 and the second filter 224 are respectively disposed at the fourth surface 225b1 and the second surface 225a2.

As shown in FIG. 2, the first light emitter 221 and the second light emitter 222 are substantially arranged side-by-side in a first direction D1. Each of the first light emitter 221 and the second light emitter 222 has a plurality of light sources (not shown). For example, the light sources are light-emitting diodes. The light sources of any of the first light emitter 221 and the second light emitter 222 are substantially arranged along a second direction D2. In the embodiment, the first direction D1 is substantially perpendicular to the second direction D2, but the disclosure is not limited in this regard. The light guide assembly 225 further includes a plurality of focusing lenses 225c and a collimating lens 225d. Each of the focusing lenses 225c is configured to focus light emitted from a corresponding one of the light sources, so as to reduce the beam angle of the emitted light of the corresponding light source. The collimating lens 225d is optically coupled between the first total reflection prism 225a and any of the focusing lenses 225c. The collimating lens 225d is configured to respectively transform the lights emitted by the first light emitter 221 and the second light emitter 222 into a first collimating light A and a second collimating light B, and is configured to make incident angles of the first collimating light A and the second collimating light B relative to the third surface 225a3 be different.

For example, in some embodiments, an included angle formed between first surface 225a1 and the second surface 225a2 is 90 degrees, and included angles formed between the first surface 225a1 and the third surface 225a3 and formed between the second surface 225a2 and the third surface 225a3 are 45 degrees. In some embodiments, an included angle formed between the fourth surface 225b1 and the fifth surface 225b2 is 90 degrees, and included angles formed between the fourth surface 225b1 and the sixth surface 225b3 and formed between the fifth surface 225b2 and the sixth surface 225b3 are 45 degrees. In some embodiments, the third surface 225a3 is parallel to the sixth surface 225b3. As shown in FIG. 3, the collimating lens 225d is configured to make the incident angle of the first collimating light A relative to the third surface 225a3 be smaller. Hence, with the foregoing configurations of the first total reflection prism 225a and the second total reflection prism 225b, the first collimating light A will sequentially pass through the third surface 225a3, the sixth surface 225b3, and the fourth surface 225b1, reach the first filter 223, and then be transformed into the first kind of light A' by the first filter 223. The first kind of light A' will sequentially pass through fourth surface 225b1, be reflected by the sixth surface 225b3, and then leave the second total reflection prism 225b from the fifth surface 225b2. Relatively, the collimating lens 225d is configured to make the incident angle of the second collimating light B relative to the third surface 225a3 be larger. Hence, with the foregoing configurations of the first total reflection prism 225a and the second total reflection prism 225b, the second collimating light B will sequentially be reflected by the third surface 225a3, pass through the second surface 225a2, reach the second filter 224, and then be transformed into the second kind of light B' by the second filter 224. The second kind of light B' will sequentially pass through second surface 225a2, the third surface 225a3, and the sixth surface 225b3, and then leave the second total reflection prism 225b from the fifth surface 225b2.

As shown in FIG. 2, with the foregoing configurations of the first total reflection prism 225a and the second total reflection prism 225b, the first filter 223 and the second filter 224 may not necessarily be parallel to each other. For example, the second light emitter 222 may not necessarily be parallel to and arranged side-by-side with the first light emitter 221 in the first direction D1, so that the distance between the first light emitter 221 and the second light emitter 222 in the first direction D1 can be reduced, and the size of the light-emitting modules 220 can be also be reduced.

As shown in FIG. 2, the light guide assembly 225 further includes a divergent lens 225e and a light guide element 225f. The divergent lens 225e is optically coupled between the fifth surface 225b2 of the second total reflection prism 225b and the light guide element 225f. The divergent lens 225e is configured to diverge the first kind of light A' and the second kind of light B'. The light guide element 225f is optically coupled between the fifth surface (via the divergent lens 225e) and the incident surface 211 of the corresponding one of the light guide plates 210. The light guide element 225f is substantially aligned with the incident surface 211 of the corresponding one of the light guide plates 210, and is aligned with the fifth surface 225b2 in a direction substantially parallel to the incident surface 211 of the corresponding one of the light guide plates 210. By using the light guide element 225f, the size of the backlight module 200 in a direction perpendicular to the incident surface 211 of the light guide plates 210 can be reduced, so as to facilitate the design of a narrow bezel of the display device 100.

As shown in FIG. 1, the controller 230 of the backlight module 200 is configured to asynchronously drive any of the light-emitting modules 220 to alternately provide the first kind of light A' and the second kind of light B'. For example, the controller 230 is configured to drive the light-emitting modules 220 to provide the first kind of light A' and the second kind of light B' respectively in four time intervals in a working cycle.

Figure 5A:
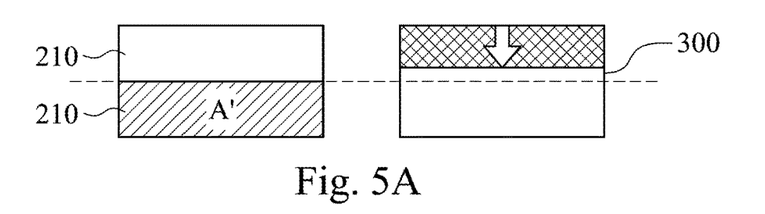
FIGS. 5A-5F sequentially illustrate operational statuses of the backlight module and a liquid crystal display panel respectively in six time intervals in a working cycle.
Figure 5B:
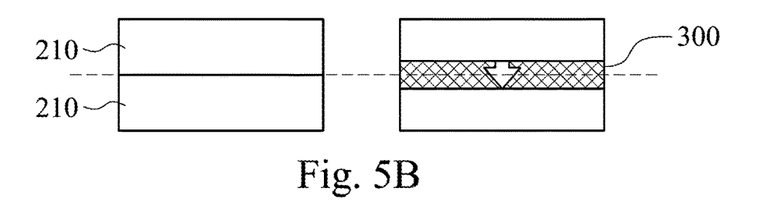
Figure 5C:
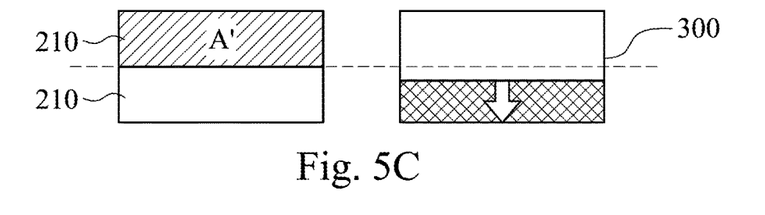
Figure 5D:
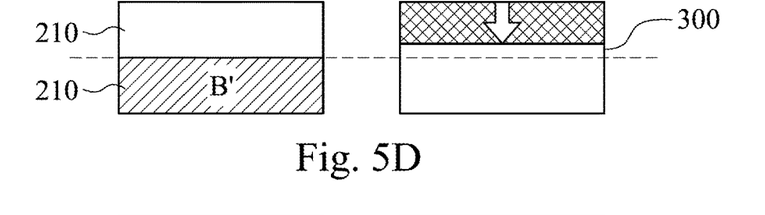
Figure 5E:
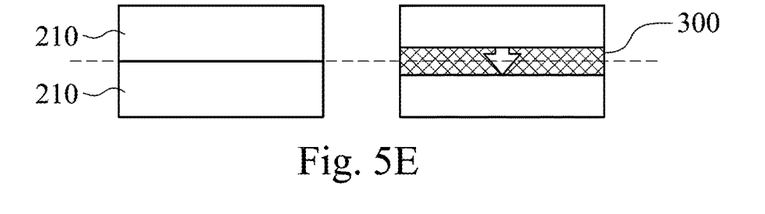
Figure 5F:
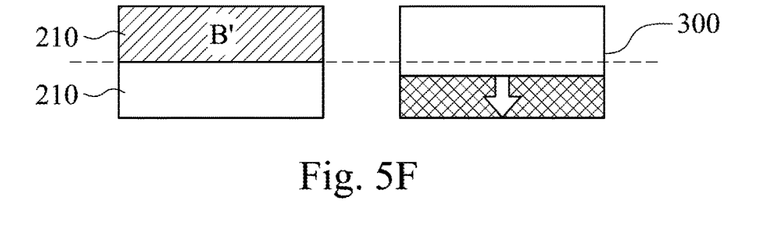

Specifically, reference is made to FIGS. 5A-5F. FIGS. 5A-5F sequentially illustrate operational statuses of the backlight module 200 and the liquid crystal display panel 300 respectively in six time intervals in the working cycle. The working cycle sequentially has a first time interval, a second time interval, a third time interval, a fourth time interval, a fifth time interval, and a sixth time interval. The liquid crystal display panel 300 has a scanning direction of vertical synchronization as indicated by the hollow arrows in FIGS. 5A-5F. The light guide plates 210 are substantially arranged along the scanning direction of vertical synchronization. As shown in FIG. 5A, in the first time interval, synchronous signals are scanned in the upper half of the liquid crystal display panel 300 (corresponding to the upper light guide plate 210), and the controller 230 is configured to drive the light-emitting module 220 corresponding to the lower light guide plate 210 to provide the first kind of light A', so as to make the lower light guide plate 210 provide a surface light source of the first kind of light A' to the lower half of the liquid crystal display panel 300. As shown in FIG. 5B, in the second time interval, synchronous signals are scanned to the center of the liquid crystal display panel 300 (corresponding to a transition area between the light guide plates 210), and the controller 230 does not drive any of the light guide plates 210. As shown in FIG. 5C, in the third time interval, synchronous signals are scanned in the lower half of the liquid crystal display panel 300 (corresponding to the lower light guide plate 210), and the controller 230 is configured to drive the light-emitting module 220 corresponding to the upper light guide plate 210 to provide the first kind of light A', so as to make the upper light guide plate 210 provide a surface light source of the first kind of light A' to the upper half of the liquid crystal display panel 300. As shown in FIG. 5D, in the fourth time interval, synchronous signals are scanned in the upper half of the liquid crystal display panel 300 (corresponding to the upper light guide plate 210), and the controller 230 is configured to drive the light-emitting module 220 corresponding to the lower light guide plate 210 to provide the second kind of light B', so as to make the lower light guide plate 210 provide a surface light source of the second kind of light B' to the lower half of the liquid crystal display panel 300. As shown in FIG. 5E, in the fifth time interval, synchronous signals are scanned to the center of the liquid crystal display panel 300 (corresponding to the transition area between the light guide plates 210), and the controller 230 does not drive any of the light guide plates 210. As shown in FIG. 5F, in the sixth time interval, synchronous signals are scanned in the lower half of the liquid crystal display panel 300 (corresponding to the lower light guide plate 210), and the controller 230 is configured to drive the light-emitting module 220 corresponding to the upper light guide plate 210 to provide the second kind of light B', so as to make the upper light guide plate 210 provide a surface light source of the second kind of light B' to the upper half of the liquid crystal display panel 300.

According to the foregoing recitations of the embodiments of the disclosure, it can be seen that the backlight module of the disclosure uses two light-emitting modules to emit lights respectively to side surfaces of two light guide plates, and the controller of the backlight module is capable of driving two light emitters in each of the light-emitting modules to provide two kinds of lights respectively in different time intervals. Furthermore, the backlight module of the disclosure can use the controller to sequentially switch on and off four light emitters by appropriately acting in concert with the scanning direction of vertical synchronization of the liquid crystal display panel, so that the display device of the disclosure can specifically implement the display technology adopting time-division multiplexing and wavelength multiplexing under the back-lit architecture. In addition, because the backlight module of the disclosure belongs to the back-lit architecture, the display device of the disclosure can effectively reduce the overall size and the number of used light sources compared with the conventional stereoscopic display device adopting the direct back-lit backlight technology.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wavelength multiplexed stereoscopic display, comprising:
   two light guide plates, each of the light guide plates having an incident surface and a light-output surface, wherein the light guide plates are arranged side-by-side to make the light-output surfaces be coplanar;
   two light-emitting modules, each of the light-emitting modules being configured to provide a first kind of light and a second kind of light to the incident surface of a corresponding one of the light guide plates, wherein the first kind of light has a first triplet, and the second kind of light has a second triplet different from the first triplet; and
   a controller configured to asynchronously drive any of the light-emitting modules to alternately provide the first kind of light and the second kind of light;
   wherein each of the light-emitting modules further comprise:
      a first light emitter;
      a second light emitter;
      a first filter having a first light reflection spectrum;
      a second filter having a second reflection spectrum; and
      a light guide assembly configured to respectively guide lights emitted by the first light emitter and the second light emitter to the first filter and the second filter, so as to respectively obtain the first kind of light and the second kind of light, the light guide assembly being further configured to guide the first kind of light and the second kind of light to the incident surface of the corresponding one of the light guide plates;
   wherein the light guide assembly further comprises:
      a first total reflection prism having a first surface, a second surface, and a third surface sequentially connected; and
      a second total reflection prism having a fourth surface, a fifth surface, and a sixth surface sequentially connected, wherein the first surface and the fourth surface face away from each other, the second surface and the fifth surface face away from each other, and the third surface and the sixth surface face away from each other,
      wherein the first light emitter and the second light emitter emit the lights toward the first surface, and the first filter and the second filter are respectively disposed at the fourth surface and the second surface;
      a light guide element optically coupled between the fifth surface and the incident surface of the corresponding one of the light guide plates, wherein the light guide element is aligned with the incident surface of the corresponding one of the light guide plates, and is aligned with the fifth surface in a direction parallel to the incident surface of the corresponding one of the light guide plates;
   an assembly axis,
   wherein the two light emitting modules and the two light guide plates each have at least one surface perpendicular to the assembly axis.

2. The wavelength multiplexed stereoscopic display of claim 1, wherein the light guide assembly further comprises:
   a collimating lens configured to respectively transform the lights emitted by the first light emitter and the second light emitter into a first collimating light and a second collimating light and configured to make incident angles of the first collimating light and the second collimating light relative to the third surface be different.

3. The wavelength multiplexed stereoscopic display of claim 1, wherein the first light emitter and the second light emitter are arranged side-by-side in a first direction, each of the first light emitter and the second light emitter has a plurality of light sources, and the light sources of any of the first light emitter and the second light emitter are arranged along a second direction.

4. The wavelength multiplexed stereoscopic display of claim 1, wherein the controller is configured to drive the light-emitting modules to provide the first kind of light and the second kind of light respectively in four time intervals in a working cycle.

5. The wavelength multiplexed stereoscopic display of claim 4, wherein the working cycle sequentially has a first time interval, a second time interval, a third time interval, a fourth time interval, a fifth time interval, and a sixth time interval, the controller is configured to drive one of the light-emitting modules to provide the first kind of light and the second kind of light respectively in the first time interval and the fourth time interval, and configured to drive another of the light-emitting modules to provide the first kind of light and the second kind of light respectively in the third time interval and the sixth time interval.

6. A wavelength multiplexed stereoscopic display device, comprising:
   a backlight module comprising:
      two light guide plates, each of the light guide plates having an incident surface and a light-output surface, wherein the light guide plates are arranged side-by-side to make the light-output surfaces be coplanar;
      two light-emitting modules, each of the light-emitting modules being configured to provide a first kind of light and a second kind of light to the incident surface of a corresponding one of the light guide plates, wherein the first kind of light has a first triplet, and the second kind of light has a second triplet different from the first triplet; and
      a controller configured to asynchronously drive any of the light-emitting modules to alternately provide the first kind of light and the second kind of light;
   wherein each of the light-emitting modules further comprise:
      a first light emitter;
      a second light emitter;
      a first filter having a first light reflection spectrum;
      a second filter having a second reflection spectrum; and
      a light guide assembly configured to respectively guide lights emitted by the first light emitter and the second light emitter to the first filter and the second filter, so as to respectively obtain the first kind of light and the second kind of light, the light guide assembly being further configured to guide the first kind of light and the second kind of light to the incident surface of the corresponding one of the light guide plates;
   wherein the light guide assembly further comprises:
      a first total reflection prism having a first surface, a second surface, and a third surface sequentially connected; and
      a second total reflection prism having a fourth surface, a fifth surface, and a sixth surface sequentially connected, wherein the first surface and the fourth surface face away from each other, the second surface and the fifth surface face away from each other, and the third surface and the sixth surface face away from each other,
      wherein the first light emitter and the second light emitter emit the lights toward the first surface, and the first filter and the second filter are respectively disposed at the fourth surface and the second surface;
      a light guide element optically coupled between the fifth surface and the incident surface of the corresponding one of the light guide plates, wherein the light guide element is aligned with the incident surface of the corresponding one of the light guide plates, and is aligned with the fifth surface in a direction parallel to the incident surface of the corresponding one of the light guide plates;
   an assembly axis,
   wherein the two light emitting modules and the two light guide plates each have at least one surface perpendicular to the assembly axis; and
   a liquid crystal display panel having a light-receiving surface, wherein the light-output surfaces of the light guide plates respectively face two parts of the light-receiving surface.

7. The wavelength multiplexed stereoscopic display device of claim 6, wherein the liquid crystal display panel has a scanning direction of vertical synchronization, and the light guide plates are arranged along the scanning direction of vertical synchronization.

* * * * *